United States Patent [19]

Johansson et al.

[11] Patent Number: 4,913,875
[45] Date of Patent: Apr. 3, 1990

[54] SWIRL VANES INTEGRAL WITH SPACER GRID

[75] Inventors: Eric B. Johansson; Louis C. Bulger, both of San Jose, Calif.

[73] Assignee: General Electric Company, San Jose, Calif.

[21] Appl. No.: 323,075

[22] Filed: Mar. 14, 1989

Related U.S. Application Data

[63] Continuation of Ser. No. 100,678, Sep. 24, 1987, abandoned.

[51] Int. Cl.$^4$ ................................................ G21C 3/34
[52] U.S. Cl. ....................................... 376/439; 376/443
[58] Field of Search ................................. 376/439, 443

[56] References Cited

U.S. PATENT DOCUMENTS

| | | | |
|---|---|---|---|
| 3,033,773 | 5/1962 | Schluderberg | 376/439 |
| 3,420,737 | 1/1969 | Marchal | 376/439 |
| 3,764,470 | 10/1973 | Calvin | 376/439 |
| 3,787,285 | 1/1974 | Marstrand | 376/439 |
| 3,847,736 | 11/1974 | Bevilacqua | 376/439 |
| 4,726,926 | 2/1988 | Patterson et al | 376/439 |

FOREIGN PATENT DOCUMENTS

| | | |
|---|---|---|
| 0148452 | 12/1984 | European Pat. Off. . |
| 1439123 | 1/1962 | Fed. Rep. of Germany . |
| 1514558 | 9/1965 | Fed. Rep. of Germany . |

OTHER PUBLICATIONS

Fuel Assemblies with Deflectors for Steam Water Separation for Boiling Water Reactors by Jorgen and Marstraid published by the Library of the Danish Atomic Energy Commission Research Establishment Riso, Jul. 1971.

Primary Examiner—Donald P. Walsh
Attorney, Agent, or Firm—Robert R. Schroeder

[57] ABSTRACT

A spacer assembly for imparting a swirl to a passing steam water mixture within a fuel channel of a boiling water reactor is disclosed. The spacer assembly is placed at periodic intervals along the inside of a square cross sectioned fuel channel so as to separate the fuel containing rods from each other and the fuel channel sides. Each discrete spacer element is constructed of a matrix of helically twisted sheet metal spacing elements for the serendipitous purposes of providing separation of the steam and water, with water being deposited on the fuel rods surfaces. Each helical element is a twisted planar metallic member and includes a rotation of the metal surfaces in the order of 450° over a typical two inches of length. For each 90° interval of rotation from the top and bottom of each helical element, paired lattice connections are provided for attachment to adjoining elements. Intermediate of the lattice connectors at 45° for confrontation to the spaced apart fuel rods, there are placed rod stops. The resultant spacer thus improves the thermodynamics of steam generation by maintaining water on the fuel rods, imparts swirl to the steam water flow between spacers, and provides a lighter and less neutron absorbing metallic mass in the reactor.

7 Claims, 8 Drawing Sheets

SWIRL VANES INTEGRAL WITH SPACER GRID

This is a continuation of application Ser. No. 07/100,678, filed Sept. 24, 1987, now abandoned.

This invention relates to spacers for fuel rods contained within square cross-sectioned fuel channels utilized in the core of nuclear boiling water reactors (BWRs). More particularly, a spatial separator for the fuel rods contained within a channel is disclosed which includes the serendipitous purpose of steam water separation for optimum steam generation.

SUMMARY OF THE PRIOR ART

A BWR fuel bundle consists of an array of fuel rods enclosed by a typically square sectioned channel. Spacers are located at several axial positions in the bundle (typically 6 or 7 locations). The spacers are typically one to two inches in axial length; the fuel channels are typically 160 inches in axial length. The primary functions of the spacers are to locate the individual fuel rods in their correct positions in the array, to prevent vibration of the rods, and to support the fuel rods when the fuel bundle is subject to handling and seismic loadings.

Subcooled water enters at the bottom of the fuel bundle and is heated by the fuel rods. Part way up the bundle the water reaches its boiling point and steam formation begins. At the beginning of the boiling region there is a thick film of water on the fuel rods, with a steam/water mixture in the regions between the fuel rods. Moving up the bundle, the water film thickness decreases. A design requirement for BWR fuel bundles is to maintain a water film over the full length of the fuel rods. This requirement limits the power which can be generated in a fuel bundle and is difficult to meet in modern high energy output reactors.

The spacers are unavoidable restrictions to the coolant flow (steam/water mixture), so a design objective is to minimize the pressure drop introduced by the spacers.

The spacers have a beneficial effect on the water film. Each spacer causes a disruption of the steam/water flow, and deposits some water droplets on the fuel rods.

The objectives of minimum pressure drop dictates a spacer with minimum flow obstruction while the objective of maximum water deposition requires a more massive structure. Current spacers designs are a composite between these objectives.

It is known to have a fuel bundle within a reactor in which rods extending the full length of the channel are accompanied by helical elements extending the full length of the channel. See paper entitled On Fuel Assemblies with Deflectors for Steam Water Separation for Boiling Water Reactors by Jorgën and Marstraid published by the Library of the Danish Atomic Energy Commission Research Establishment Riso, July 1971. This reactor effectively substituted the helical elements extending the full length of the fuel channel for rod elements. Abnormal back pressures in the rising steam water mixture were present because of the length of the helical elements. Additionally, the material required to fabricate such elements constituted an absorber of neutrons degrading reactor performance.

It is known to utilize egg crate type spacers. These spacers can have short vanes on the top of the egg crates where they brace the rod. This does impart turbulence to the passing fluid. The separation of steam from water with the classification of the water to and towards the rods within the reactor is not disclosed or suggested.

SUMMARY OF THE INVENTION

A spacer assembly for imparting a swirl to a passing stream water mixture within a fuel channel of a boiling water reactor is disclosed. The spacer assembly is placed at periodic intervals along the inside of a square cross sectioned fuel channel so as to separate the fuel containing rods from each other and the fuel channel sides. Each discrete spacer element is constructed of a matrix of helically twisted sheet metal spacing elements for the serendipitous purpose of providing separation of steam from the water in steam/water mixture, and depositing water on the fuel rod surfaces. Each helical element is a twisted planar metallic member and includes a rotation of the metal surfaces in the order of 450° over a typical two inches of length. For each 90° interval of rotation from the top and bottom of each helical element, paired lattice connections are provided for attachment to adjoining elements. Intermediate of the lattice connectors for confrontation to the spaced apart fuel rods, there are placed rod stops for bearing directly against the fuel rods. The lattice connections at intermittent locations also form spring supports for exposing one spring to each cell defined by four adjacent helical elements. The supported spring biases the fuel rod to one cell side. Alternately, provision can be made for forming the helical elements with central longitudinally extending slots to form integral built-in springs, alternately in adjacent clockwise and counterclockwise dispositions. When the spacers are installed at spaced apart vertical locations within a fuel channel (for example 7 two-inch spacers evenly distributed along a fuel channel in the order of 160 inches of length), steam separation to the inside of each helical element with water separation to the outside of each helical element and onto the steam generating rods occurs. The resultant spacer thus improves the thermodynamics of steam generation by maintaining water on the fuel rods, separating the steam from the water in the steam/water flow, and providing a lighter and less neutron absorbing metallic mass in the reactor than prior art spacers.

OTHER OBJECTS, FEATURES AND ADVANTAGES

The invention of the subject disclosure is an improvement over current spacers. It deposits more water on the fuel rods and has a lower pressure drop. The water deposition is accomplished by swirl vanes which impart a swirl component to the coolant flow. The swirl vanes provide a major part of the spacer structure, and offer little resistance to the coolant flow. The action of the swirl vanes can be described.

A swirl vane is located in each subchannel to create a swirl flow, or vortex, in each subchannel. The swirl vane consists of a twisted strip with projecting arms. The projecting arms are welded to the projecting arms of adjacent swirl vanes, to form a continuous structure.

The swirl flow creates a centrifugal force acting radially outward from the center of the subchannel. The heavy water droplets move towards the fuel rods because of the centrifugal force. This physical principle is used in steam separators and in centrifuges, but with different geometries. The swirl flow persists for some distance after each spacer, so that water deposition on the fuel rods continues between spacers.

The swirl vanes consist of twisted strips of Zircaloy or Inconel. As the water/steam mixture in the subchannel flows through the spacer, the twisted strip forces it to follow a helical path, imposing a rotational component of flow.

The amount of material used in the disclosed swirl vanes spacers is less than that of prior art spacers. The cross-sectional area of the swirl vane spacer is also less than that of prior art spacers, giving less restriction of the coolant flow through the spacer. The swirl flow affects the flow distribution between spacers concentrating the steam in the central region of each subchannel. The flow distribution gives a lower pressure drop between spacers than is obtained with prior art spacers. There is some pressure drop associated with creating the swirl flow but the net effect is to give a lower pressure drop through the fuel bundle.

Other objects, features, and advantages of this invention will become more apparent after referring to the following specification and attached drawings in which:

Figure 1:
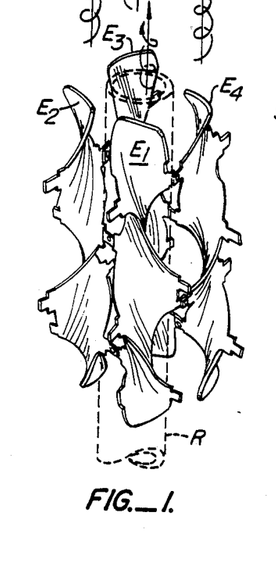
FIG. 1 is a perspective view of four helical elements joined in a cell array about a fuel rod shown in phantom with arrow schematics illustrating the helical turbulence imparted to an upwardly flowing steam water mixture.

Referring to FIG. 1, the serendipity of this invention can be easily understood. A fuel rod R is shown in broken lines. It is surrounded by helical spacer elements E1, E2, E3, and E4. These four helical spacer elements E1-E4 form a cell for confining the rod R.

At the same time, the spacer elements impart swirl to the passing steam water stream circulating upwardly through the fuel channel.

Helical elements E1, E3 are twisted in the clockwise direction. Consequently they impart to the after water steam flow a clockwise helical path.

Likewise, elements E2, E4 are twisted counterclockwise. Consequently, they impart to the passing water steam flow a counterclockwise helical path.

This vortex has a classifying effect on the steam water mixture. Specifically, the water will be thrown to the outside of the helix and thus onto rod R (or adjacent rods not shown). Steam, being lighter, will confine itself more centrally of the elements E1-E4. In such confinement the steam will occupy the volume which was interstitial to the rods.

Rods R can have heat transfer problems related to steam generation. Specifically, if large areas of steam accumulate on the surface of the rods, the normal transfer of heat from the water to the passing stream does not occur. The rod can develop local hot spots. This is especially true to and toward the top part of the channel.

Further, the reader will understand that this description is a simplification. There have, in fact, been identified feedback characteristics to such pockets which seriously interfere with reactor efficiency. Simply stated, by the intermittent placement of the spacer element of this invention, these difficulties are lessened.

Figure 2:
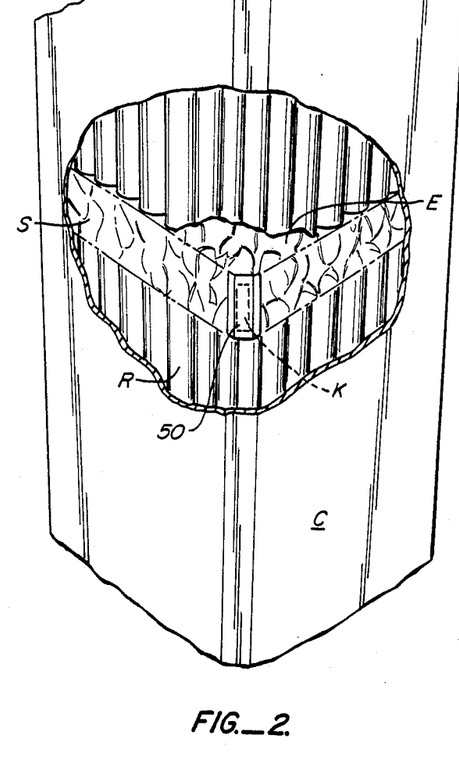
FIG. 2 is a perspective, broken away, of a fuel channel illustrating one spacer according to this invention placed interiorly of a square sectioned fuel channel.

Referring to FIG. 2, the placement of a typical spacer is illustrated. Channel C is shown having a plurality of rods R confined within the channel. The side wall of channel C is broken away at the spacer S. The spacer S includes numerous elements E joined in a matrix.

The reader will understand that the fuel channels are on the order of 160 inches in length. The individual spacer elements are on the order of two inches in length. Typically, seven such spacers are distributed along the length of any individual fuel channel. It will, therefore, be understood that the spacers have two functions.

First, and as to those areas of the rod wherein the spacers overlap, they impart the described swivel flow.

Secondly, and as to the volume of water within the channel about the rods between the spacers, overall swirl flow with the disclosed separation of steam and water is imparted.

Figure 3A:
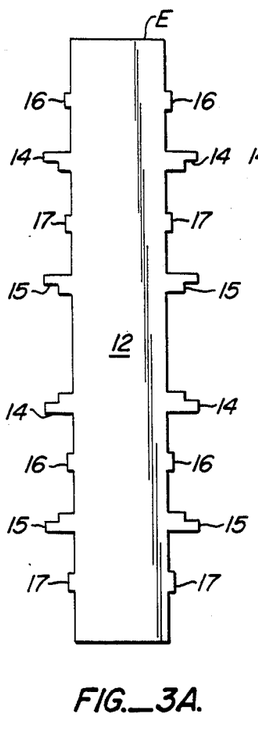
FIG. 3A is a plan view of a planar metal sheet cut to fabricate an individual helical element of this invention.
Figure 3B:
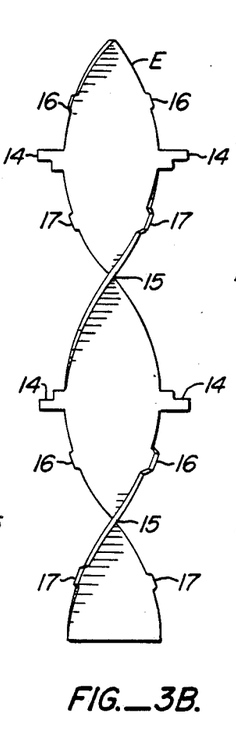
FIG. 3B is an illustration of a counter clockwise twisted metal element of FIG. 3A, the element being twisted over 450° of helical revolution.
Figure 3C:
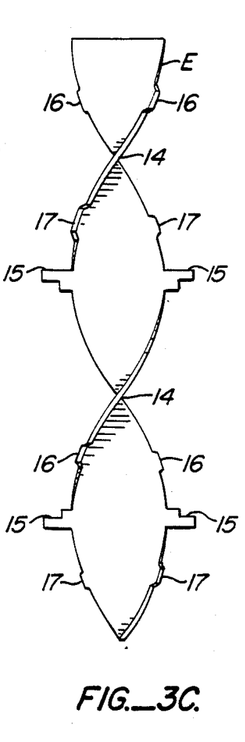
FIG. 3C is the element of FIG. 3B rotated 90° so that the alternate disposition of the lattice connectors may be completely understood.

Referring to FIG. 3A, the construction of an individual element E is schematically illustrated. First, element E includes a flat strip of metal 12 in a rectangular configuration. Metallic element 12 has two types of tabs protruding from its longitudinal side edges. The first of these tabs are lattice connectors 14, 15. Lattice connectors 14 are disposed so as to remain exposed in the same plane of every 180° of rotation. They form the connection of the respective elements one to another.

Lattice connectors 15 are disposed at an angle 90° with respect to connectors 14. These respective lattice connectors form connections to adjacent elements.

It will be seen that the lattice connectors 14, 15 are L-shaped. The base of the L is to and towards the side edge of the rectangular strip 12. The shank of the L is normal to and directed away from the side edge of the strip 12.

A second protruding element includes stops 16, 17. These respective stops bear against the surfaces of adjacent tubes. Two paired stops 16 and 17 are found in the top 180° of rotation of the elements. Likewise, two stops 16 and 17 are found in the bottom 180° rotation of the elements. This disclosed placement of stops will be shown to provide eight discrete stops surrounding each fuel rod.

Fabrication of the individual elements E can be easily understood. Typically the material will be stamped from sheet metal. Thereafter, twisting over the disclosed 450° of angle can occur. This can occur either by exerting tension between the top and bottom edges and physically twisting or by stamping the element E in stages to impart twist.

Figure 4A:
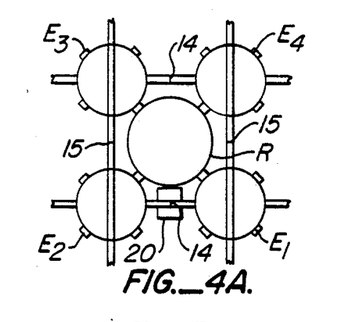
FIG. 4A is a schematic view looking down upon a spacer cell with a fuel rod contained therein illustrating the spring bias of the rod against stops defined by the helical element.
Figure 4B:
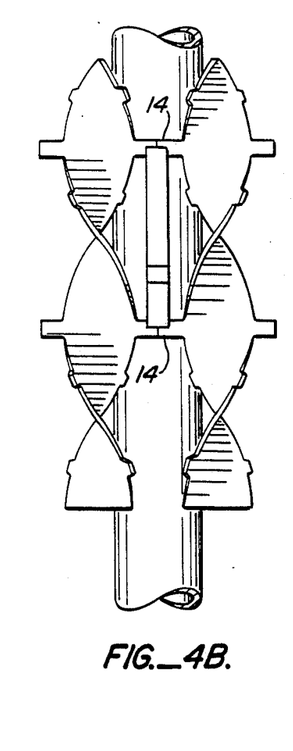
FIG. 4B is a side elevation of the view of FIG. 4A illustrating placement of the spring.
Figure 4C:
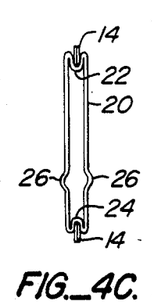
FIG. 4C is a view of the spring.

Referring to FIGS. 4A, 4C, it has been found possible to place a spring within the matrix of elements E. Referring to FIG. 1, elements E1, E2, E3 and E4 are illustrated. These elements form a cell. Matrix connectors 14 and 15 are likewise illustrated. These matrix connectors 14 have been welded together.

Referring to FIG. 4C, a spring is illustrated. The spring typically comprises an endless loop of metal 20. The loop is bent with a notch 22 at the top and a notch 24 at the bottom. These notches fit to the respective joined matrix connectors 14. The spring includes two protuberances 26. Protuberances 26 are capable of contacting a rod on one and the other sides of the spring. It can thus be seen that one placed spring in accordance with FIG. 4C biases rods in two cells. It will be seen that the spacer element only requires one spring exposed to each cell. Therefor, one spring will usually accommodate the needs of two adjacent cells.

Figure 4D:
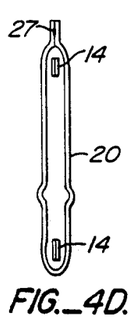
FIG. 4D is a view of a first alternate embodiment of the spring.

Referring to FIG. 4D, an alternate embodiment of the spring 20 is disclosed. Specifically endless loop by a spot weld on two parallel portions of the spring. Preferably, the spring ends are spot welded so as to close over tabs 14 or 15 extending between adjacent helical elements.

Figure 4E:
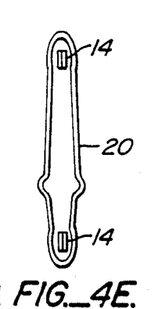
FIG. 4E is a view of a second alternate embodiment of the spring.

Referring to FIG. 4E, a second alternate embodiment of the spring 20 is disclosed. In this case the endless loop of the spring is placed in between the tabs 14, 15 as the discrete elements are joined in a matrix. It should be apparent from the examples shown that construction here illustrated, spring 20 will admit of numerous modifications.

Referring to FIG. 4A, it will be noticed that with the presence of the spring 20, some of the stops 16, 17 are not used. Conceivably, these stops could have been removed from the metal strip 12 before it was twisted to form the helical shape herein disclosed. However, this is not preferred as the axial symmetry disclosed in FIG. 3A enables twisting of the resultant strips to be uniform.

It will also be realized that those stops utilized for clockwise twisting, are the stops that are not utilized when the strip is twisted counterclockwise—assuming the identical placement of the spring 26 with respect to the rod. Likewise, for counterclockwise twisting, the stops that are not utilized are utilized when the twisting is clockwise. It will thus be realized that as a practical matter maintaining the symmetry shown enables one stamped part to serve with uniformity in all cell locations.

Figure 5A:
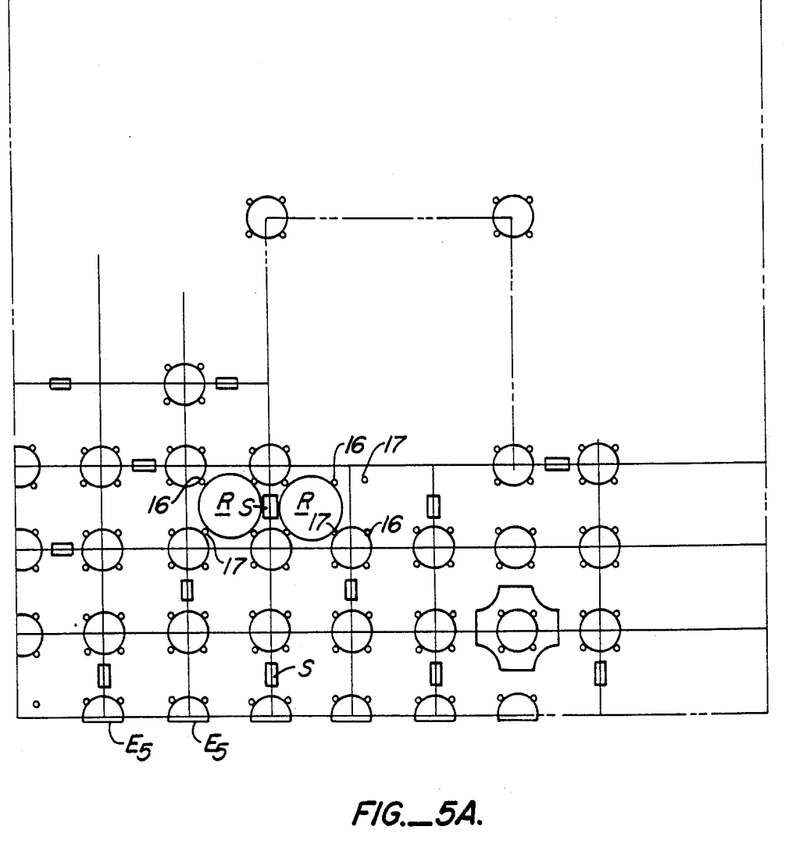
FIG. 5A is a plan schematic of a spacer according to that shown in FIG. 2 illustrating placement of the spring stops and subchannel assembles.
Figure 5B:
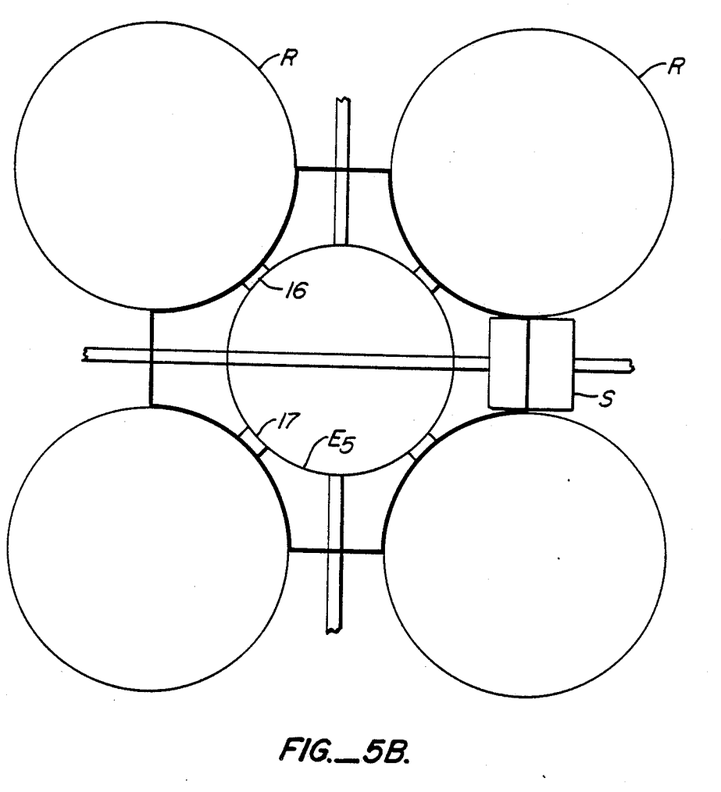
FIG. 5B is a plan of a subchannel assembly.

Referring to FIG. 5A, a schematic diagram is illustrated. The diagram shows two rods R, stops 16 and 17, with intermediate spring S. The spring S biases the rods in each of the discrete cells onto adjacent stops.

It will be noted that with respect to FIG. 5A, that truncation of the elements E5 has occurred. This truncation has occurred at the side edge.

Figure 6A:
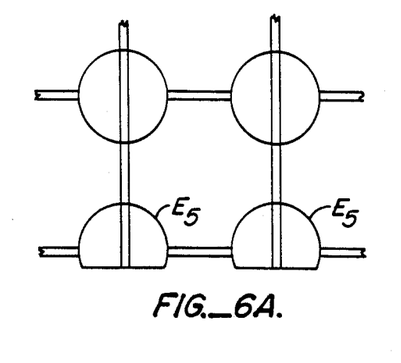
FIG. 6A is a plan of the outer edge of the spacer.
Figure 6B:
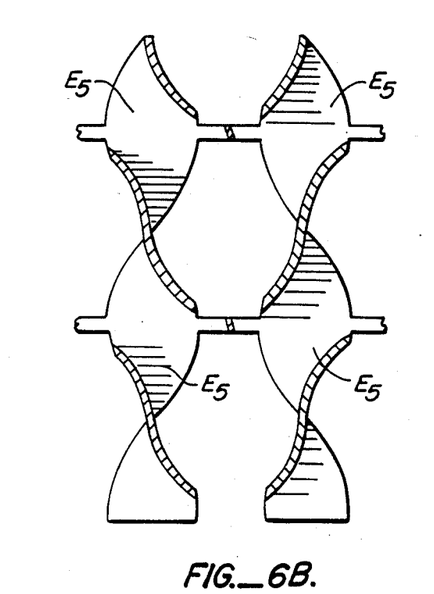
FIG. 6B is a side elevation of the outer end of a spacer.

Referring to FIG. 6B, the appearance of the spiral elements E is shown in the plan.

It is, of course, possible to build within the spiral elements E a natural spring mechanism. Such a natural spring mechanism is illustrated with respect to FIGS. 7A, 7B, and 7C.

Figure 7A:
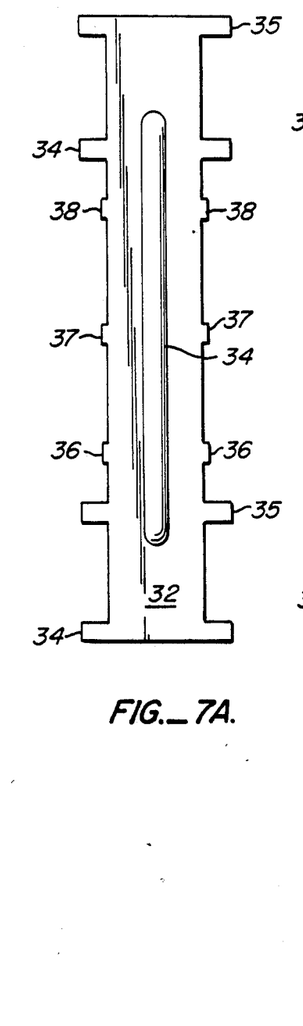
FIG. 7A is a side elevation of a slit helical element (similar to FIG. 3A), the slit being placed for the introduction of spring forces into the individual element.

Referring to FIG. 7A, a rectangular sheet 32 defining a longitudinal slit 34 is illustrated. Matrix connectors 34 are located at the bottom and 90° of rotation from the top. Matrix connectors 35 are located at the top and at 90° rotation from the bottom. Appropriate stops 36, 37, and 38 are defined therebetween.

Figure 7B:
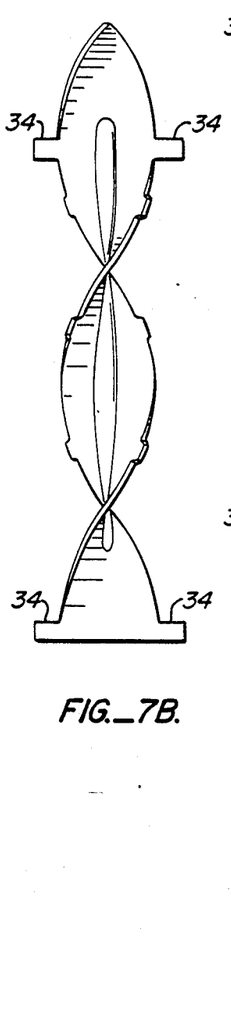
FIG. 7B is a side elevation of the twisted element similar to FIG. 3B.
Figure 7C:
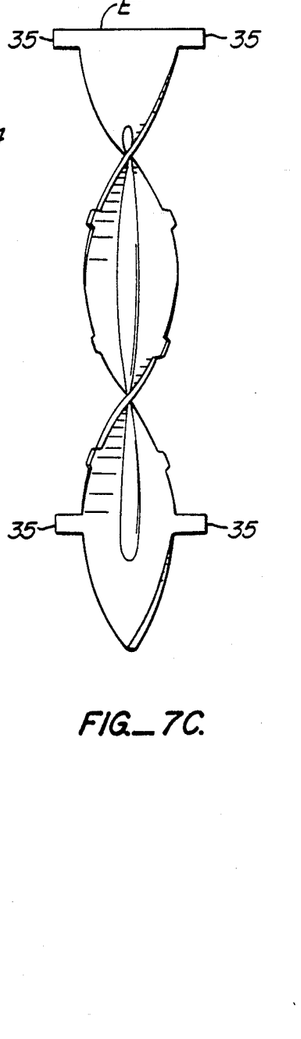
FIG. 7C is a side elevation of the rotated element similar to FIG. 3C.

Looking to FIG. 7B, lattice connectors 34 form a connection to the lattice along one plane. Referring to FIG. 7C, lattice connectors 35 form a connection along an orthogonal plane.

It can be seen that the center section of the element E is resilient.

Figure 8A:
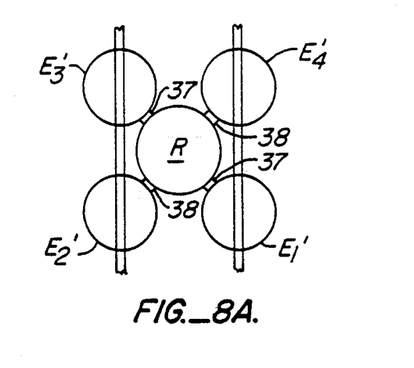
FIG. 8A is a plan view of the spacer elements of FIG. 7 assembled in a cell array.
Figure 8B:
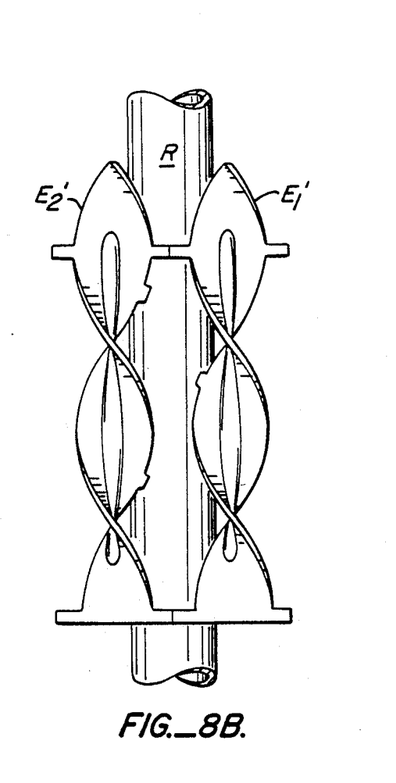
FIG. 8B is a side elevation view of the spacer elements of FIG. 8A.

Referring to FIG. 8A, elements E1', E2', E3' and E4' are shown about a rod R. The helical elements E1'-E4' bias at their stops against the rod R. This construction is illustrated in plan at FIG. 8B.

Figure 9:
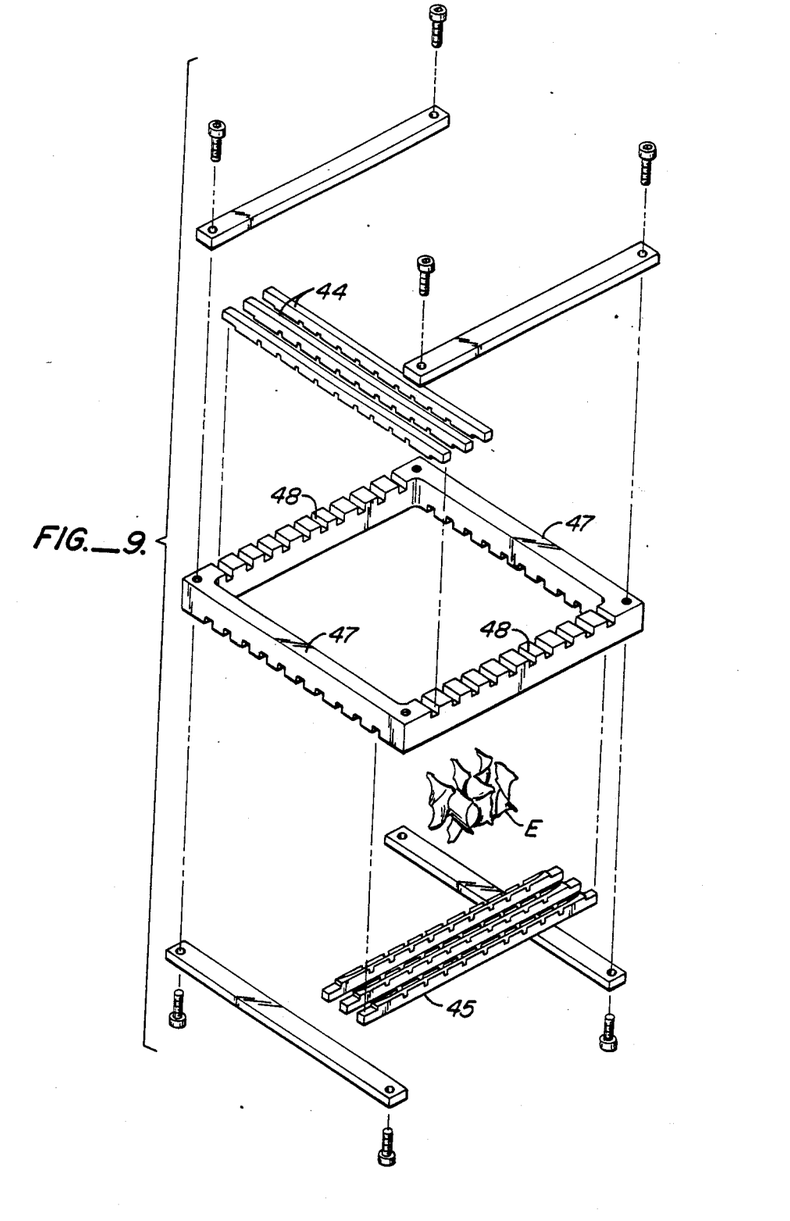
FIG. 9 is an exploded view of a jig capable of holding the spacer elements in an array to enable the elements to be spot welded or laser welded into the assembly shown in FIG. 2.

Referring to FIG. 9, an exploded view of a jig for fabrication of the matrix elements is illustrated. Specifically, elements E are captured at their respective matrix connectors 14 and 15. They are captured so that the matrix connectors are disposed side-by-side. Such capture occurs with elements 14 being trapped by notched bars 44 and elements 15 being trapped by notched bars 45. Such trapping occurs between bars 47 overlying bars 45 and bars 48 bars 44.

The reader will understand that it may be desirable to place the springs in a loop around the matrix connectors. In such placement, around the matrix connectors, the springs are placed first in the jig. Thereafter, the springs are manipulated one side or to the other side while the required spot welds are made.

It may be desirable to place corner elements K to the matrix. Such corner elements K can be spot welded and can include a stop on the inside edge thereof (shown in broken lines at 50 in FIG. 2).

The reader will understand that variations in the length and width of the individual elements making up this novel spacer can occur. For example, spacer elements need not be restricted to the preferred length set forth herein. For example, spacer elements need not be restricted to the preferred length and width set forth herein. The length and width can be adjusted depending on fuel bundle design requirements. If low pressure drop through the spacer is desired, the width of the elements is reduced and the length is increased to give a weaker swirl component of flow. If maximum separation of steam and water is desired, the maximum width is used and the length is reduced.

The reader will thus understand that there is shown a serendipitous rod spacer device. The required rod spacing is maintained, heat transfer from high power reactor fuel rods is improved, and pressure loss through the spacer is reduced.

What is claimed is:

1. A spacer assembly for use in a nuclear boiling water reactor for imparting a swirl to a passing steam water mixture within an elongate polygon section elongate fuel channel having elongate longitudinally extending fuel rods comprising in combination:
   a matrix of helically twisted sheet metal spacing elements, each helically twisted sheet metal element forming a continuous helix and having a small fraction of the total length of said elongate fuel channel, said helically twisted sheet metal elements arrived so that each said fuel rod has a plurality of said helically twisted sheet metal spacing elements surrounding a small fraction of the total length of said rod in substantially the same horizontal plane of said rod,
   each helically twisted sheet metal element intermediate an upper helically twisted end and a lower helically twisted end defining protruding lattice connectors spanning between adjacent said helical elements to form points of connection between adjacent said discrete helically twisted sheet metal elements to enable each said helically twisted sheet metal element to be joined into a matrix of said helical elements about each said fuel rod;
   means connecting said defined protruding lattice connectors together whereby said helical elements space said fuel rods one from another, space said fuel rods from said fuel channel and impart a helical flow and turbulence to a passing fluid stream.

2. The invention of claim 1 and wherein each said rod is contained within a cell surrounded by four helical elements.

3. The invention of claim 1 and wherein at least one of the helical elements of said spacer is formed clockwise and at least one of the helical elements of said spacer is formed counterclockwise.

4. The invention of claim 1 and including a spring connected to said lattice connectors for biasing a rod in said cell.

5. The invention of claim 1 and wherein said helical element is centrally slit, said helical element having contact with said fuel rod with spring bias at said slit.

6. A fuel bundle for a boiling water nuclear rector comprising in combination:
   an elongate vertical length channel member defining a polygon hollow interior;
   a plurality of correspondingly elongate length and vertical rods extending along the hollow interior of said channel member;
   a plurality of spacers at preselected vertical intervals each spacer having a vertical height which is a small fraction of the elongate length of said channel and fuel rods, each said spacer placed at widely separated spatial intervals in said elongate length channel at differing elevations, said spacers surrounding said rods, keeping said rods from contact one with another and spacing said rods with respect to said channel insides, said spacer consisting of a matrix of continuously twisted helical elements, said matrix of continuously twisted helical elements being interspersed in noninterferring relation with said matrix of said fuel rods;
   each continuously twisted helical element forming a continuous helix from the top portion thereto to the bottom portion thereof;
   said continuously twisted helical elements at each spacer being disposed in substantially the same horizontal plane with respect to each said fuel rod and each continuously twisted helical element having a vertical length less that one-tenth, the length of said channel; and
   said continuously twisted helical elements defining connector elements attached thereto and spanning between adjacent said continuous twisted helical elements;
   means for joining said connector elements one to another for disposing said continuously twisted helical elements in a matrix about said rods, whereby said rods are spaced one from another, said rods are spaced from said channel side wall, and the continuously twisted strip configuration of said spacer elements imparts helical flow path to water flowing upwardly through said channel.

7. The invention of claim 6 and wherein at least one of said helical elements imparts helical water flow upwardly and clockwise and wherein another of said helical elements imparts helical flow to water upwardly and counterclockwise.

* * * * *